United States Patent [19]
Freeport

[11] Patent Number: 5,993,869
[45] Date of Patent: *Nov. 30, 1999

[54] PACKAGED MICROWAVE POPCORN FORMULATION

[75] Inventor: Dana Sue Freeport, St. Louis Park, Minn.

[73] Assignee: ConAgra, Inc., Edina, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/516,912

[22] Filed: Aug. 18, 1995

[51] Int. Cl.$^6$ ............................. B65D 81/34; A23L 1/18
[52] U.S. Cl. ............................. 426/107; 426/90; 426/93; 426/607
[58] Field of Search ........................ 426/107, 234, 426/111, 113, 93, 607, 99, 90

[56] References Cited

U.S. PATENT DOCUMENTS

| | | |
|---|---|---|
| 2,222,560 | 11/1940 | Clickner . |
| 2,240,759 | 5/1941 | Chandler . |
| 2,475,133 | 7/1949 | Max Frank Furter et al. . |
| 2,518,247 | 8/1950 | Nairn . |
| 2,604,407 | 7/1952 | Martin . |
| 2,648,610 | 8/1953 | Martin . |
| 2,702,246 | 2/1955 | Kinsell . |
| 2,843,080 | 7/1958 | Woodruff . |
| 3,102,032 | 8/1963 | Lippert . |
| 3,617,309 | 11/1971 | Rebane . |
| 3,704,133 | 11/1972 | Kracauer . |
| 3,783,820 | 1/1974 | Hautly et al. . |
| 3,843,814 | 10/1974 | Grunewald-Kirstein . |
| 3,973,045 | 8/1976 | Brandberg et al. . |
| 4,038,425 | 7/1977 | Brandberg et al. . |
| 4,096,281 | 6/1978 | Young et al. . |
| 4,219,573 | 8/1980 | Borek . |
| 4,409,250 | 10/1983 | Van Hulle et al. . |
| 4,450,180 | 5/1984 | Watkins . |
| 4,548,826 | 10/1985 | Watkins . |
| 4,691,374 | 9/1987 | Watkins et al. . |
| 4,880,646 | 11/1989 | Lew et al. . |
| 4,956,193 | 9/1990 | Cain et al. . |
| 5,008,024 | 4/1991 | Watkins . |
| 5,044,777 | 9/1991 | Watkins et al. . |
| 5,097,107 | 3/1992 | Watkins . |
| 5,132,125 | 7/1992 | Lew et al. . |
| 5,190,777 | 3/1993 | Anderson et al. ................. 426/107 |
| 5,214,257 | 5/1993 | Riskey ............................. 426/107 |
| 5,284,666 | 2/1994 | Graf . |
| 5,302,790 | 4/1994 | Turpin . |
| 5,357,086 | 10/1994 | Turpin et al. . |

FOREIGN PATENT DOCUMENTS

WO 9501105  1/1995  WIPO .

OTHER PUBLICATIONS

Technical Data: Cargill 600 GDVO (2 pages). No date.
Technical Data: Cargill Cleary Valley High Oleic Canola Oil (2 pages). No date.
Clear Valley (Cargill) Product Literature (6 pages). No date.
Lipids in Foods, Chemistry, Biochemistry & Technology, 1993 Pergamon Press, p. 147 Plus.
Oils, Fats & Fatty Foods, 1966, Williams, American Elsevier Publ. p. 211 Plus.
Margarine and Other Fats, 1956, Schwitzer, Interscience Publ. p. 277 Plus.
Food Science —2nd Ed 1973, Avi Publ., Potter p. 451 Plus.
Elements of Food Technology, Desrosier, Avi Publ. 1977.

*Primary Examiner*—Steven Weinstein
*Attorney, Agent, or Firm*—Merchant & Gould P.C.

[57] ABSTRACT

A microwave popcorn product is provided. The product includes a flexible expandable bag having a charge of unpopped popcorn and oil/fat-containing slurry therein. The oil/fat-containing slurry includes a solid oil component and a liquid oil component. Preferred products may be blended to have advantageous nutritional characteristics.

7 Claims, No Drawings

PACKAGED MICROWAVE POPCORN FORMULATION

FIELD OF THE INVENTION

The present invention concerns microwave popcorn. It particularly concerns formulations for preferred microwave popcorn products. The invention also concerns methods for preparing such formulations, products in which such formulations are used, and methods of use.

BACKGROUND OF THE INVENTION

The present disclosure relates to microwave popcorn and its preparation. That is, the disclosure concerns arrangements that involve unpopped kernels of popcorn which are prepared and presented in a manner such that they readily pop, upon exposure to microwave energy in a microwave oven.

In many conventional microwave popcorn systems, the popcorn is packaged in a flexible, foldable, typically paper, construction with: oil/fat; flavoring, if desired, for example salt; and, optionally, coloring. When the package is placed in the microwave oven, the popcorn is popped in the presence of the oil/fat and the flavoring/coloring is distributed over the popcorn.

A typical such system is used in the consumer product ACT II® Buttered Popcorn, available from Golden Valley Microwave Foods, Inc. of Edina, Minn., the Assignee of the present invention. A typical such product contains, in each bag, about 70–80 grams of popcorn and about 30 grams of an oil/fat slurry. The oil/fat slurry includes about 9% salt by weight, with the remainder primarily comprising the fat/oil, and some butter flavor (about 2% butter flavor, including the weight of the carrier for the flavor, typically maltodextrin).

It is important that such microwave popcorn products be substantially shelf stable. In these types of systems, "shelf stability" is generally associated with the following principal characteristics.

(1) Some acceptable, preferably very low level of wicking or leakage of oil/fat from the inside of the package, during storage and handling at normally encountered ambient temperatures;

(2) An acceptably low level of moisture loss from within the popcorn kernels, during storage and handling;

(3) A polyunsaturated oil presence sufficiently low that undesirable levels of oxidation do not occur during storage.

In general, loss of moisture from the kernels is typically associated with less efficient and effective popping, and loss of oil/fat is associated with increased scorching, less flavor distribution and a less efficient popping process.

In general, in conventional systems of the type previously described, control of moisture loss and shelf stability are, in part, obtained through the selection of a particular type of oil/fat and the utilization of selected, preferred, amounts of the oil/fat material. More specifically, the typical oil/fat component of common, conventional microwave popcorn charges is a solid, partially hydrogenated soybean oil. Such a material has a melting point (Mettler Dropping Point) of about 100–105° F. and a SFI (Solid Fat Index-AOCS Cd 10-57, Dilatometric) typically as follows:

| Temperature (° F.) | Solid Fat Index (SFI) |
|---|---|
| 50 | 53–57 |
| 70 | 38–42 |
| 92 | 14–18 |
| 104 | 3.5 maximum |

One such material, available from Cargill Refined Oil, Minneapolis, Minn. 55440, as a microwave popcorn shortening, has a free fatty acid (oleic) content of 0.04% maximum (AOCS Ca 5a-40), and a moisture content (AOCS Ca 2c-25, Karl Fisher Method) of 0.10% maximum. The peroxide value is about 1.0 Meq/Kg maximum (AOCS Cd 8-53).

This product contains a fatty acid content, by weight, of about: 10.2% C16 unsaturated; 10.2% C18 unsaturated; 40.2% C18 monounsaturated (oleic); 34.3% C18 monounsat. trans(elaidic); 1.7% C18:2 cis(diunsaturated); 2.3% C18:2 trans(diunsaturated); 0.1% C18:3 unsat. (cis); 0.1% C20 saturated; and 0.3% C22 saturated. Thus it contains about 20.8%, by weight, saturated fatty acids; about 74.5%, by weight, mono-unsaturates (cis+trans); and about 4.1% polyunsaturates. The content of trans unsaturates (total) is about 36.6%.

Such a material is generally desirable for shelf stability since it is relatively solid under most handling conditions, for example storage at room temperature or even in warm environments. Since it is solid, i.e. has a relatively high SFI index, it does not readily wick into or permeate conventional greaseproof-type paper sheets of the type used in conventional microwave constructions. Thus, it does not readily leak from the systems, or wick through the systems, in use.

In addition, in conventional systems such an oil/fat is typically utilized in an amount, by weight, such that it has enough volume to substantially engulf or enrobe the popcorn kernels (i.e. about 27⁺ grams of oil/fat per 70–80 grams of unpopped kernels). This tends to trap the moisture within the kernels, and to inhibit loss of moisture from the kernels during storage. Because the oil/fat material sets up (solidifies) rather quickly during processing, and does not melt and flow substantially under normal handling (ambient) conditions, the kernels can remain engulfed within the oil/fat during storage, and less moisture loss from the unpopped kernels occurs.

In general, solid, partially hydrogenated soybean oil in the amounts indicated has been the oil of choice for many conventional microwave popcorn systems. Not only is the material associated with shelf stability, when used in conventional paper microwave popcorn packaging, but also it is associated with good flavor and texture, and does not substantially scorch or burn during the microwave popcorn process, even when in close thermoconductive proximity to microwave interactive constructions such as the microwave susceptors used in conventional packaging.

In addition, the oil/fat, during the microwave popping process, for conventional systems, is an important component in the distribution of flavoring/color over the popped kernels. In general, the flavoring and color is dispersed in the hot liquid oil/fat during the microwave popping process, and as the kernels pop and bounce around inside the bag, the liquified oil/fat splashes over them, distributing the flavor and colorant to the surfaces of the flakes. This presents the product with a desirable hue or color and desirable aroma. Also it is associated with relatively high flavor impact, since the flavorant is located on the outer surfaces of the flakes where it will be readily encountered by the taste buds of the consumer when the product is eaten.

In recent years, consumer interest in the nutritional values of snack foods, such as popcorn, has heightened. In many instances, consumers prefer to prepare their foods by means other than through the utilization of substantial amounts of oil/fat in the preparation process. This general consumer desire has been addressed by the microwave popcorn industry, through the development of "light" or "ultra-light" popcorn products.

Some approaches to presenting light or ultra-light products to the microwave popcorn industry, have simply involved the utilization of less of the same solid, partially hydrogenated, soybean oil as used in other products, per gram of unpopped popcorn kernels, in the microwave popping formulations. That is, typically the approach has involved the continued use of solid, partially hydrogenated soybean oil, but in lesser amounts. A typical such product contains about 6.5 to 7.5 grams of partially hydrogenated soybean oil per 77 grams of unpopped popcorn kernels, i.e. the oil being provided as a flavored slurry with the slurry provided in an amount of 9–10 grams per 77 grams of unpopped kernels. In general, the continued use of the solid, partially hydrogenated soybean oil has been associated with good shelf stability, with respect to wicking or leakage from the package, due to the solid nature of that oil/fat material. However, utilization of lesser amounts of the oil has involved less enrobing of the kernels, and thus a greater propensity for moisture loss. In some systems, this has been addressed by the utilization of better moisture barrier overwrap packaging, for the microwave popcorn products.

The utilization of lower amounts of fat/oil in conventional products has also been associated with a need for greater control of cooking time in order to avoid scorching. In some instances, it has also involved less effective distribution of flavorant/colorant, over the kernels.

In addition, completely satisfactory nutritional limits have not been achieved with these conventional systems.

Relatively recently, "no-added fat" microwave popcorn systems (i.e. systems which are free of added fat) have been developed. Such systems are described, for example, in U.S. patent application Ser. No. 08/198,892 filed Feb. 18, 1994, now abandoned; Ser. No. 08/391,437 filed Feb. 21, 1995, now abandoned; and Ser. No. 08/397,481 filed Mar. 2, 1995, now U.S. Pat. No. 5,585,127, each of which is incorporated herein by reference, and is owned by Golden Valley Microwave Foods, Inc. In general, such systems involve coating of the individual kernels, before packaging, with an adhesive composition including flavorant/colorant. Thus, the kernels are maintained in individual flowable form, each being coated and having flavorant adhered thereto. Essentially no oil/fat is added to the system, to facilitate cooking.

Such arrangements have been relatively effective. However, it has been found that, in general, some consumers prefer the mouth-feel, hue, aroma, and/or taste, associated with oil/fat. Thus, it is desirable, if possible, to develop an improved fat-containing, low-fat microwave popcorn system that is shelf stable, includes a sufficient amount of oil/fat for the satisfaction of certain consumer preferences and which also meets preferred nutritional guidelines.

SUMMARY OF THE INVENTION

According to one aspect of the present invention, a microwave popcorn product is provided. The microwave popcorn product comprises a flexible expandable bag in which popcorn received within the bag is popped, and used. In typical applications, the bag or bag construction comprises a single or multi-ply paper bag, preferably including a microwave interactive construction. The typical preferred bag is a paper construction having a single internal chamber. The microwave interactive construction may comprise, for example, a metallized polymeric film.

In microwave popcorn products according to the present invention, a charge of unpopped popcorn kernels and oil/fat-containing slurry is positioned in the bag interior. In certain preferred products, the charge contains at least 2 grams and typically 2.3 to 2.9 grams of added oil/fat per 78 grams of unpopped kernels and at least 2 grams of added oil/fat per bag. This figure includes all added oil/fat to the popcorn, including any provided with the colorant or flavorant as a carrier. The total charge of slurry, including weight of flavorant/colorant, for certain preferred formulations is about 4.5–4.9 grams of slurry per 78 grams of unpopped kernels.

In certain preferred arrangements, the components of the popcorn charge are selected such that the popcorn product, when popped, has a calculated nutritional content of: no more than 3 grams of total fat, per 30 gram serving; and, less than 0.5 grams of unsaturated fat (typically less than 0.48 and preferably less that 0.45 grams), per 30 gram serving. The term "calculated nutritional content" in this context is meant to refer to a calculation based upon the total weight of ingredients within the bag, and not necessarily just the weight of ingredient delivered to the consumer when the product is consumed. That is, the "calculated nutritional content" takes into account residue that may remain in the bag after the popcorn is consumed.

In certain preferred formulations according to the present invention, the amount of trans unsaturated fatty acids can also be maintained at a very low level (typically 0.3 gram/serving or less), and the products are such that the total amount of trans unsaturated fatty acid and saturated fatty acids, together, is less than 1.0 and typically less than 0.8 gram per 30 gram serving. This is highly advantageous for the preferred nutritional assertion and advantages.

It is not a requirement that all products, according to some applications of the principles described herein, meet the list of preferred calculated nutritional contents defined in the previous paragraph. However, it is a substantial advantage that the techniques described herein can be applied in such a manner that the nutritional contents recited can be readily obtained for certain, most preferred, preferred products.

In general, in products according to the present invention, the oil/fat-containing slurry includes a oil/fat component comprising a blend of: a solid oil component, sometimes referred to as the "first component" or "first solid oil component"; and, a liquid oil component, sometimes referred to as the "second component" or "second liquid oil component". Either of these components may comprise a mixture of materials.

The oil/fat-containing slurry may optionally include flavorant, colorant or other additives. The term "flavorant" as used herein is meant to include within its scope added salt, even when the salt provides for some benefit or operation in addition to flavoring. In general, the amount of flavorant used should be in an amount effective to provide the desired or acceptable taste to the consumer. In general, the amount of colorant used should be an amount effective to provide the desirable hue or color, for the consumer.

In some instances, colorant or flavorant provided in oil/fat-containing slurries according to the present invention may be derived from commercial producers in a form in which the colorant or flavorant includes an oil therein as a carrier. Herein when reference is made to the amount of fat/oil-component in the oil/fat-containing slurry, or the added oil/fat in the product, any oil added merely as an ingredient with flavorant should be taken into consideration. However, in general, the amount of oil in such flavorants, as will be seen below, can be modified by choosing various alternate sources of flavorant (or alternate carriers), if it is perceived that any such oil/fat is a problem. Typically, however, by adjusting the relative amount of solid oil component and liquid oil component, any oil in the colorant or flavorant can be readily accommodated.

In general, when the oil/fat-containing slurry includes salt, it preferably includes at least about 1.1 grams, and typically at least 1.88 grams of salt per 4.7 grams of total slurry (to 78 grams of unpopped kernels). Preferably the salt is provided as a powdered salt or fine grind salt, or a mixture of such materials. The term "fine grind salt" as used herein is meant to refer to a material which is at least as fine as 70–200 mesh U.S. Standard, and preferably at least about 45%, by weight, is 200 mesh or finer. Stated in terms of nutritional content, preferably the salt component in products according to the present invention is at least 200 mg per 30 gram serving, typically about 300–400 mg per 30 gram serving, and preferably no more than about 340 mg per 30 gram serving. At such levels, a good flavor impact can be readily achieved.

In typical compositions according to the present invention, the first solid oil component comprises partially hydrogenated vegetable oil having a solid fat index at 50° F. of at least about 50 and preferably 53–57. Such preferred materials are commercially available as solid, partially hydrogenated soybean oils, such as the Cargill microwave popcorn shortening referenced above.

A purpose of the solid oil component is to provide the overall slurry with a sufficient solid character so that leaking/wicking from the package is inhibited. Preferably a minimum amount effective to achieve this is used, without loss of desireable taste, mouth-feel and aroma. The particular amount will depend on the other contents of the slurry and the total amount of slurry chosen for any given system, per gram of popcorn kernels. Typically, for preferred compositions according to the present formulations, the oil/fat-containing slurry will comprise no less than about 25%, and typically no less than about 28%, by weight, of this component.

The maximum amount of this solid oil component present will primarily be dictated by the total amount of slurry it is desired to have added, and the nutritional limitations that it is desired to have met. Typically for preferred compositions of the type identified herein, the oil/fat-containing slurry will comprise no more than about 40%, by weight, and typically no more than about 32%, by weight, of the solid oil component. Thus, in preferred compositions the slurry contains 28–32%, by weight, of the solid oil component.

In typical preferred compositions according to the present invention, the second oil component, or liquid oil component, comprises a liquid vegetable oil. The term "liquid" in this context is meant to refer to a material which is liquid at room temperatures, and typically which is liquid in refrigerators at temperatures of about 40° F. In certain preferred compositions according to the present invention, the liquid oil component is a modified liquid vegetable oil, for example a liquid, high oleic acid vegetable oil. The preferred oil is Canola oil, preferably a modified Canola oil, as described herein.

Preferably, the liquid oil component is a "high oleic acid" liquid oil. This term is meant to refer to a liquid vegetable oil which has been modified from its natural form, to have an increased or higher oleic acid presence. In general, a material according to the present invention will be considered to be a modified oil of this type if it includes at least 10% more, by weight, oleic acid in its modified form, than in its natural or unmodified form. Typically and preferably the liquid vegetable oil component is a material which has been modified to have at least 20%, by weight, more oleic acid content, and most preferably has at least 25%, by weight, more oleic acid content, than in its unmodified form. Modified Canola oils, which meet these limitations, are commercially available as the preferred modified Canola oils reported herein. Herein in this context when it is said that the material contains 25% more oleic acid, reference is meant to a percent of the natural content. For example, if the natural oleic acid content is 58%, by weight, modification to provide a content 25% higher would be modification to a total of 72.5% oleic acid.

The amount of liquid oil component contained in oil/fat-containing slurries according to the present invention will be varied depending upon the total amount of slurry it is desired to be used, and the types and amounts of other components included within the slurry. In general, the maximum amount of liquid oil component used will be limited by an amount such that the overall blend is sufficiently solid, to resist undesired levels of wicking/leaking in use. The minimum level will be an amount below which the blend is so dominated by the solid oil component that undesirable nutrition levels are provided. In certain typical preferred compositions, according to the present invention, the oil/fat-containing slurry comprises at least 12%, by weight, of the liquid vegetable oil component, and preferably comprises no more than about 30%, by weight, of the liquid vegetable oil component. Most preferably, the slurry contains 18–22% of the liquid vegetable component.

In the definitions of "solid oil component" and "liquid oil component" given above, oil added merely as a carrier for the colorant or flavorant was generally not considered. The nature of this oil may have an effect on the systems. However, if the flavorant (or colorant) chosen is one which has an oil carrier, and the nature of the oil is such that the characteristics of the overall slurry or product are undesirably affected, in general it is believed that an alternate flavorant or flavorant carrier (colorant/colorant carrier) can be chosen. It is noted, however, that some of the preferred formulations herein include flavorant which has a liquid oil carrier and this flavorant is well accommodated in compositions as defined. In general, it is anticipated that the maximum amount of oil from colorant and/or flavorant carrier which will be present in the slurry will be about 20%, by weight, and typically 16%, by weight, or less. In general, it is believed that most flavorants or colors which are carried in oil, are carried in a liquid soybean oil, which contains about 11% saturated oil in its liquid form and zero trans fatty acids, unless it has been hydrogenated.

According to the present invention, a charge of popcorn and slurry is provided, for microwave popping. The charge generally comprises unpopped popcorn kernels, and an oil/fat-containing slurry. Preferred slurries are as indicated above with respect to popcorn products.

Also according to the present invention, an oil/fat-containing slurry for use in popping microwave popcorn is provided. Preferably the slurry is as defined above, for preferred popcorn products.

The present techniques also include methods for preparing products, charges and slurries as defined herein; and, methods of use.

DETAILED DESCRIPTION

I. Components of a Microwave Popcorn System

In general, popcorn popping systems of greatest interest to the presently described techniques are microwave popcorn systems. The ones of particular interest are microwave popcorn systems wherein the consumer product comprises an expandable, flexible popcorn bag, typically made of paper or cellulosic material, having a charge of popcorn/slurry therein. The popcorn component of the charge comprises unpopped kernels, typically having a moisture content of about 11 to 14%, by weight. The slurry, in general, comprises an oil/fat-component; and, optionally, flavorant and/or colorant. Herein, "flavorant" in this context is intended to include within its scope salt, even when the salt is provided for effects in addition to taste. The slurry may optionally include other adjuvants.

On the store shelf, the popcorn bag with the charge of popcorn/slurry therein is typically provided in a folded configuration. In use, it is unfolded and placed in a microwave oven by the consumer. During popping, the popcorn kernels puff into flakes, and the bag expands under the heat and steam generated.

Typically, the consumer product is sold and stored in a folded form, wrapped in an overwrap. The overwrap is removed before the popping operation. The overwrap provides a barrier to moisture loss and provides for convenient handling.

A. Saturated and Unsaturated Oil/Fats

In general, consumer preferences in food products have not only involved the desirability of relatively low added fat compositions, but also, where possible, the utilization of relatively little added "saturated" fats or oils. Thus, there is marketing advantage to providing a product which can be labelled as including "zero saturated fat". In general, under present FDA guidelines, a "zero saturated fat" claim can be made if the product contains a level of saturated fat of less than 0.5 gram of saturated fat per serving. For popcorn, the standard definition of a serving is 30 grams of popped flakes (including any additives). In practice, 30 grams of popped, flavored flakes are typically made from about 35–40 grams of kernels/slurry mixture. Thus a typical consumer product, including about 70–80 grams of kernels, comprises about 2 to 3 servings, depending on the amount of slurry provided.

Of course, there is also an advantage of being able to market a product as "low fat". In general, under present FDA guidelines, this requires the presence of no more than about 3 grams of fat per serving.

The partially hydrogenated soybean oils typically used in conventional microwave popcorn systems, contain about 20–21%, by weight, saturated fats or oils. In general, low amounts of the conventional partially hydrogenated, soybean oils have not been sufficient for completely satisfactory microwave popcorn products. Typically, they are associated with higher propensities of scorching, and less desirable levels of flavor distribution. The products that result are not generally found to be as flavorful or to provide as desirable aroma/taste, texture and hue for the consumer. Thus, "low fat" products using partially hydrogenated soybean oil as the oil/fat, especially when the desire is to provide a product that is "zero saturated fat", have not been readily obtained.

B. Trans-Fatty Acids

In general, it is presently believed that of the mono-unsaturated fatty acids, trans fatty acids are less desirable nutritionally, than cis fatty acids. The partially hydrogenated soybean oil products typically used as microwave popcorn shortening, contain substantial amounts of trans fatty acids (usually at least 34%). Indeed typically, they contain about 34% to 37% trans fatty acids, by weight, most in the form of a C18:1 trans fatty acid, i.e. elaidic acid.

It is not only desirable to have products which are low in saturated fats, but it is preferred, if possible, under present nutritional theories, to provide materials that include relatively low levels of trans-unsaturated fatty acids, if possible. The conventionally used slurries containing partially hydrogenated soybean oils fail to meet this.

As indicated below, in certain preferred compositions according to the present invention, materials are used which not only provide for low trans fatty acid content, but which also provide for a total content of trans fatty acid and saturated fatty acid together of less than 1.0 gram per 30 gram serving, typically and preferably less than 0.8 gram per 30 gram serving.

C. Liquid Oils

In general, many liquid vegetable oils, or liquid, modified, vegetable oils, contain relatively low levels of unsaturated fats or oils. It is noted for example that in the movie theater industry (where hot oil poppers are used rather than microwave) recently a great deal of focus was directed on the saturated fat content of oils. In response to this, the industry has to some extent moved to liquid vegetable oils. In some instances, Canola oil or modified Canola oils were used. However, for some consumers an undesired taste resulted, and more recently attention has focussed on the utilization of sunflower oils for such purposes.

Unfortunately, liquid oils have generally been unacceptable for use in microwave popping systems. A reason is that they are liquid at room temperatures and readily wick through conventional, paper, microwave packaging materials. In addition, if even a pinhole leak developed in such packaging, the oil would simply run through the pinhole during storage, not only generating a mess but leaving the popcorn uncoated and susceptible to less desirable popping.

D. A Blend of Fat/Oils

According to the present invention a unique blend of fat/oils is used, to advantage, in microwave popcorn products. The blend (sometimes referred to as a fat/oil-containing component) is such that a generally shelf stable product can be obtained, using conventional microwave popcorn processing techniques and conventional paper packaging. That is, in spite of liquid oil component in the blend, the material has a sufficient SFI (typically at least 20 and usually 23–25 at 50° F.) under normal handling conditions that substantial leaking through conventional paper microwave popcorn packaging is not observed to be a problem.

In addition, a particular preferred blend is provided such that low fat products (i.e. no more than 3 grams of fat per serving) which readily pop are obtained. Indeed, a particular preferred class of materials described herein can be used to achieve a product which is not only "low fat" but which is also of a formulation that can be described under the FDA guidelines as "zero saturated fat". In one preferred blend, a material containing relatively low levels of trans-unsaturated fats is provided.

The above desirable characteristics can be obtained with certain preferred applications according to the present invention, in spite of the fact that the slurry mixed with the popcorn in the popcorn bag comprises, by weight, at least 18% liquid vegetable oil. This is accomplished by blending the liquid vegetable oil with a solid fat/oil component in sufficient amount that overall blend has a desirable SFI for shelf stability.

In general, according to the present invention the slurry to be applied to the popcorn charge includes:

(1) a fat/oil component or blend; and, (2) optional flavorant and/or colorant.

The slurry may contain other adjuvants.

In general, according to the present invention the fat/oil-component contains:

(1) a first solid (at room temperature) fat/oil component; and (2) a second liquid (at room temperature) fat/oil component.

In formulations according to the present invention, the first solid component may comprise a mixture of materials; and/or the second liquid component may comprise a mixture of materials. In typical applications of the techniques described herein, the first solid component will comprise a commercially available solid fat/oil material, primarily comprising a mixture of fatty acids; and, the second liquid component will comprise a commercially available liquid oil material, also primarily comprising a mixture of fatty acids.

The fat/oil-component generally comprises the greatest component, by weight, of the overall slurry, provided in typical, preferred compositions according to the present invention. As suggested above, in addition to the fat/oil blend, fat/oil-containing slurries according to the present invention would generally include flavorant and/or colorant (including any fat/oil in the flavorant/colorant).

In preferred applications of the present invention, the slurry will comprise at least 35%, by weight, and preferably 45–55%, by weight, fat/oil-component as defined. The remainder of the slurry composition will generally comprise the flavorant and/or colorant, including any oil contained therein. In general, it is foreseen that the amount of oil contained in any flavorant and/or colorant will be relatively low, typically less than 20%, by weight, of the overall oil/fat slurry, and typically no more than about 16%, by weight, of the slurry. This oil, of course, needs to be considered in calculating nutritional values, but it is generally disregarded herein when the solid oil component and the liquid oil component, oil/fat-component or blend are defined. This is in part because if the carrier oil presence it is high enough to cause an undesirable effect on shelf stability or cooking, it can typically be replaced by use of a flavorant that does not include the oil as a carrier.

When it is said that the slurry contains the fat/oil-component referenced above, it is not meant that the fat/oil-component is necessarily provided in the slurry as a pre-blended mixture. The separate components of the fat/oil-component may be mixed into the overall slurry in separate mixing steps. Various processing details with respect to this, are provided below.

In preferred applications of the present invention, at least 25%, preferably 28–32%, by weight, of the slurry comprises the solid fat/oil component of the fat/oil blend. Preferably no more than 40%, by weight, of the slurry comprises the first solid component.

Also preferably at least 12% and more preferably about 18–22%, by weight, of the overall slurry comprises the second liquid oil component. Preferably no more than about 30%, by weight, of the slurry comprises the second liquid oil component.

In typical preferred compositions the weight ratio of the solid oil component to the liquid oil component, in the fat/oil-containing component as defined, will be within the range of about 2:1 to about 0.75:1. For the preferred compositions presented hereinbelow, rations of about 1.5:1 are used. Of course, specific formulations may dictate the ratio for nutritional purposes.

1. The Solid Fat/Oil Component

The preferred solid fat/oil component is a material which, when used in the composition in a preferred amount, provides the overall slurry with an SFI or leaking/wicking character at least comparable to stick margarine. That is, the slurry is preferably at least as solid as stick margarine. A reason is that stick margarine is of a consistency that is acceptable with respect to shelf stability in materials such as those from which conventional paper microwave popcorn bags are made. The specific SFI value of at least 20 at 50° F., preferably 23–25 at 50° F., for the overall slurry, is typical for preferred compositions according to the present invention, but is not essential to the obtaining of some benefit. However, it is an advantage that a slurry having at least such SFI values can be obtained, using techniques according to the present invention.

Preferably, the solid fat/oil component is a vegetable oil, more preferably a partially hydrogenated vegetable oil. Also preferably, it is a material having a melting point of at least 100° F., and preferably no more than about 110° F.

Preferred materials for the solid fat/oil component are partially hydrogenated vegetable oils conventionally used in microwave popcorn arrangements, and especially partially hydrogenated soybean oil. A useable such material is the Cargill microwave popcorn shortening, as defined above, commercially available from Cargill Foods of Minneapolis, Minn. 55440. Another commercially available and useable material is Hydro Soy (86-574-0) available from Archer Daniels Midland (ADM) of Decatur, Ill. 62525.

2. The Liquid Oil Component

Preferably, the liquid oil component is a vegetable oil. Most preferably, it is a material which is liquid at 40° F. or below, i.e. at and above refrigerator temperatures. It is preferably a material which is relatively low in trans-unsaturated fatty acids.

A preferred liquid oil component is Canola oil. A particular preferred Canola oil is the modified Canola oil available from Cargill under the commercial designation "Clear Valley High Oleic Canola Oil". This Canola oil is a modified oil (i.e. a high oleic oil) having a relatively high mono-unsaturated fatty acid content, a very low trans mono-unsaturated fatty acid content, and a very low saturated fatty acid content. In particular its saturated fat level is about 7% and its unsaturated fat level is about 75%. Its oleic acid presence is about 75% also, thus indicating that its trans content is very low. It also contains about 9% linoleic acid and about 6% linolenic acid, by weight.

E. Processing

It is an advantage of preferred compositions, according to the present invention, that they can be formulated to be introduced into conventional microwave bag constructions, without the need for modification to the bag, through use of conventional bag filling techniques and equipment. For example, conventional flexible bag arrangements for microwave popcorn are generally sufficiently greaseproof with respect to the leaking or wicking oils therefrom, that the compositions according to the present invention can be used therewith, without modification. Some microwave bag arrangements with which compositions according to the present invention may be utilized, are described for example in U.S. Pat. Nos. 4,450,180; 4,548,826; 4,691,374; and 5,044,777, incorporated herein by reference.

In typical processing, the microwave popcorn bag will have been prepared, with an open top. A charge of popcorn will be placed in the bag, by a dispenser. For a typical consumer product, the popcorn charge will comprise about 78 grams of popcorn, i.e. about 550–650 unpopped kernels.

In typical processing, the next step will be the addition of the fat/oil slurry, containing any flavorant and/or colorant, to the kernels. In general, it is important to ensure that the liquid slurry is directed into the popcorn charge in a manner such that it is thoroughly dispersed thereover, during the process. In follow-up processing, the popcorn bag is generally sealed closed, folded and encased in a moisture barrier outer protective wrap, typically a cellophane-type wrap.

The processing steps thus far described are generally analogous to those for conventional arrangements. However, two modifications are preferred for compositions according to the present invention. These are as follows:

First, preferred applications according to the present invention involve the addition of about 4.7 grams of slurry (i.e. typically about 4.4 to 4.9 grams) for 78 grams of unpopped kernels, in the charge. This is a relatively low amount of slurry, by comparison to many high fat conventional arrangements. It is found that as a result of this, it is generally more important to ensure that the slurry is directed into the popcorn charge, rather than merely into the bag, during the processing operation. If the slurry charge is directed against the inside of the bag, but not directly into the popcorn kernels, sufficient amounts of the slurry may not reach the popcorn kernels to ensure a preferred popping operation.

Another modification from conventional high fat systems is with respect to the cellophane overwrap. Slurries according to the present invention, while they engulf the popcorn charge somewhat, do not do so as much as slurry charges that include large amounts of solid oil/fat. Thus, to ensure protection against loss of moisture from the popcorn kernels, it may be desirable to use a cellophane overwrap that is less moisture permeable than the cellophane overwraps used in conventional high fat content popcorn compositions. Preferred materials for the overwrap are provided hereinbelow.

As explained above, preferably the fat/oil slurry, including flavorant and/or colorant, is added to the popcorn charge in a liquid form. This can generally be accomplished retaining the slurry at a temperature of no less than about 110–115° F., before addition to the popcorn charge. It is an advantage of preferred compositions according to the present invention that they can be provided in the holding tank of conventional systems, at conventional temperatures, and can be applied using conventional spraying equipment. Thus, conversion of assembly line operations to the provision of compositions according to the present invention can be accomplished with minimal modification. In addition, relatively inexpensive spray techniques can be utilized to distribute the composition into the popcorn.

In general, the components of slurries according to the present invention may be mixed using continuous-mix techniques or batch-mix techniques. The components may be added at various orders. However, in general, preferred processing will comprise batch mixing with the batch being mixed in a mixing tank according to the present order of steps:

(1) liquify the solid component with heat (about 130° F.) and meter it into the mixing tank;
(2) add the liquid oil component and blend; and
(3) with further agitation, add any salt to be used.

In general, if other flavorant and/or colorant are used, they will be added later, in a mixing (holding) tank other than the originally used mixing tank, so that the first mixing tank does not become "contaminated" with the flavorant/colorant. In this manner, the first mixing tank can be utilized for both colored and uncolored systems, or for various flavors.

In general, the order of steps given is preferred because it ensures that there will be a large (by volume) liquified oil phase, for dispersing of the salt and other flavorant. In typical compositions, the weight percent of salt will be rather high (because the amount of slurry added is low) and when the salt is added, the composition will thicken considerably and be less easily mixed. Thus, equipment which can stir or agitate a relatively thick mixture is needed. Conventional popcorn slurry mixing equipment can be used.

In general, slurry compositions according to the present invention will be maintained at about 110° to 115° C. so that the solid oil/fat component does not "set up" or solidify, prior to spraying into a popcorn charge.

II. Typical Consumer Products

In this section, two typical consumer products containing materials according to the present invention are presented. Possible variations will be apparent from the general disclosure.

A. The Popcorn Charge

In a typical "low fat", "zero unsaturated fat" consumer product, the contents of the popcorn bag will include, by weight, 78 grams of unpopped popcorn kernels and 4.7 grams of the fat/oil slurry containing the flavorant and colorant. This will generate about 2.26 servings per bag (accounting for moisture loss during popping). The unpopped popcorn kernels may be of the type conventionally used for microwave popping, for example large yellow, high volume popcorn blends available from Vogel Popcorn Co., Hamburg, Iowa.

In the following table, a preferred formulation of the slurry is provided:

| Ingredient | Preferred % By Weight In Slurry | Grams/Bag | Typical Range In Slurry |
|---|---|---|---|
| Soy oil | 29.667 | 1.394 | 25–40% |
| Salt | 40.0580 | 1.883 | 23–48% |
| Flavor | 9.1380 | 0.429 | 0–10% |
| Liquid oil | 20.6550 | 0.971 | 12–30% |
| Colorant | 0.4820 | 0.023 | 0–2% |

The above preferred formulation, which is for a butter-flavored product, is based upon utilization of the following commercially available material as the components:

For the soy oil, partially hydrogenated soybean oil as described above, available from Cargill Refined Oils, Minneapolis, Minn. 55440, as the microwave popcorn shortening referenced above.

For the salt component, preferably a very fine grind or powdered salt is used. An acceptable material is the one available under the trade name Morton Salt 200 from Morton International (Morton Salt, Chicago, Ill. 60606). This material goes through 100–325 U.S.S mesh. Another usable salt material is available under the designation Morton Flour, from Morton Salt. This material is 70–240 USS mesh. Still another useable material is Premier Prepared Flour Salt available from Cargill Salt Division, Minneapolis, Minn. 55440. A reason why fine grind or powdered salt materials are preferred, is that they can be more readily dispersed in the oil, and thus be evenly spread over the kernels as they pop. Also, the higher surface area of finer salt is associated with higher flavor impact.

For the flavor in a butter flavored product, preferably Tastemaster Butter Flavor #279831 (Tastemaker, Cincinnati, Ohio 45216) and Danisco Butter Flavor, Danisco #2488 (Danisco, New Century, Kans. 66031) are used, blended to taste.

For the liquid oil, preferably a modified Canola oil is used. Most preferably, the commercially available material obtained under the designation Clear Valley High Oleic Canola and characterized as a high mono-unsaturated Canola popping oil, from Cargill Foods, Minneapolis, Minn. 55440 is used.

For the colorant, in the butter flavored material, preferably natural colorant CHR.AT-420-S, available from Chris Hansen's Laboratory, Inc., Milwaukee, Wis. is used. This material leaves a somewhat yellow or golden hue in the product.

In the designation in the above table titled "range" some percent by weight ranges for the components are provided. These are ranges in which it is presently believed that the components could be used, with some beneficial and desirable results obtained. The particular stated preferred formulation, is the one specific formulation presently believed most preferred for a butter-flavored consumer product.

The nutritional analysis of the above preferred formulation is as follows:

\# Servings/bag: 2.26; effective pop. vol. (cc's): 2800–3500

| Item | Gram/Serving |
| --- | --- |
| Protein | 4.0 |
| Fiber | 4.0 |
| Sugar | 0.0 |
| Fat | 2.5 |
| Polyunsaturated | 1.5 |
| Monounsaturated | 1.0 |
| Saturated | 0.4[1] |
| Sodium (mg) | 340.0 |

[1]Thus entitling an FDA claim of zero saturated fat.

The total amount of trans-monounsaturated fatty acids in the formulation turns in part on the selection of oils. When the preferred oils identified are used it is only about 0.25 grams/serving.

The above preferred formulation was prepared and tested. The product had a good butter flavor, good salt impact, high pop volume and no scorching.

In the following table, a preferred formulation for a natural or non-buttered flavored slurry formulation is provided:

| Ingredient | Preferred % By Weight In Slurry |
| --- | --- |
| Solid oil | 30.0000 |
| Salt | 39.6250 |
| Flavor | 9.5000 |
| Liquid oil | 20.8750 |

Of course, useable weight ranges would generally be as stated previously.

The preferred commercial ingredients are as defined for the butter flavored except for the flavor which is TM nat. 335136 available from Tastemaker, Cincinnati, Ohio 45216. This is a corn flavor in an oil base.

The nutritional analysis for the above formulation is the same as the butter flavored. The number of servings/bag and pop volume are the same.

It is presently foreseen that variations in the above formulations may be utilized, as desired. In general, the amount of fat/oil-component per gram of kernels should be in the range of about 0.033 to 0.37 for preferred effects. The weight of the slurry added to grams of kernels may vary substantially, depending up the weight of the flavorant (including salt) in the slurry solution, however. For example, in the slurry of the examples provided above, the amount of salt, by weight, is about 40%. This results in the delivery of a high impact salt flavor to the consumer, with the overall salt content in the composition still no more than about 340 mg per serving. It will be apparent that if a less strong salt flavor is desired, even though the same amount of fat/oil blend may be used per weight of unpopped popcorn, a lower amount of slurry per weight popcorn can be used.

B. The Popcorn Bag

As explained above, conventional popcorn bag arrangements may be utilized, with popcorn charges according to the present invention. One type of usable arrangement comprises a conventional 2-ply bag arrangement, with a microwave interactive construction positioned between the plys. Such an arrangement is described, for example, in U.S. Pat. No. 5,044,777, incorporated herein by reference. Such an arrangement would generally be folded from a panel or sheet having dimensions of about 12 inches by 21 inches to form a bag about 5.5 inches by 12 inches. In general, the sheet of paper which forms the outer surface of the bag, when folded, would be a 23 lb blended Kraft paper (lb/ream). The sheet of paper which forms the innermost ply paper, or the inside of the bag, would be a 23 lb greaseproof paper. Both papers may be treated with a fluorochemical material, for grease resistance, typically 3 M fluorocarbon FC807. Such materials are conventional. The laminating adhesive between the plys of paper could be a typical conventional adhesive used in such arrangements, for example Duracet 12, available from Franklin International, Inc. of Columbus, Ohio; or H. B. Fuller WO-3460ZZ, H. B. Fuller, St. Paul, Minn.

The microwave susceptor arrangement would be positioned as described in U.S. Ser. No. 08/389,755, now abandoned incorporated herein by reference. That is, it would be positioned between the two plys and in a location over which the popcorn charge rests, when the bag arrangement is unfolded and placed in a microwave oven for cooking. The microwave interactive material would preferably comprise a metallized polymeric film, such as Hoechst Celanise polyester film (typically 48–92 gauge) vacuum metallized with aluminum to give a density of 0.2–0.3 as measured by a Tobias densitometer. A company which can prepare such a microwave interactive material is Madico of Wobecan, Mass. 01888.

The preferred cellophane overwrap, in which the bag construction would be positioned for storage, would comprise 140–160 gauge biaxially oriented polypropylene. The heavier gauges (or wraps with improved moisture barrier characteristics) would be preferred for improved moisture retention. The material PK3197 available from Simpro of Houston, Tex. 77041 is useable.

III. Variations

For the principles described above, variations and applications of the techniques of the present invention will be understood. In general, the variables of greatest interest involve: the total amount of slurry it is desired to have added per weight of popcorn; the percent weight of the slurry which comprises non-oil/fat material; and the overall nutritional content desired. Within these variables, a mixture of liquid oil and solid oil is used, to advantage. As indicated above, relative amounts of solid oil component and liquid oil component are generally chosen to achieve: a desired shelf stability without undesirable wicking/leaking; a desired overall mouth feel, texture, flavor and aroma in the final popped popcorn product; and, desirable controlled popping. In addition, the relative amounts of the materials will be selected such that, in the overall amount of slurry provided, the desired nutritional limits are obtained. It will be understood, however, that the specific amounts of materials chosen will in part be affected by some of the other variables mentioned. For example, if the slurry weight is changed from a preferred formulation presented herein, such that substantially less salt component is present, it will be desirable to use a lower weight of overall slurry, per gram of popcorn, in the product, thereby achieving the same amount of oil/fat added per gram of popcorn. Similarly, if the amount of non-oil/fat component in the slurry, for example flavorant, is increased over the formulations presented herein, it may be desirable to use a higher amount of slurry added per gram of popcorn, in order the achieve the same levels of oil/fat in the final product. Thus, the specific formulations provided herein should be considered to provide direction for the achievement of products, with variations made, as desired, to achieve different specific flavoring formulations, etc.

What is claimed is:

1. A microwave popcorn product comprising:
   (a) a flexible, expandable bag, in which popcorn is popped, in use;
      (i) said flexible bag having an inner paper ply, an outer paper ply and a microwave susceptor positioned between the inner and outer paper plies;
   (b) a charge of unpopped popcorn kernels and an oil/fat-containing slurry, in said bag interior;
      (i) said charge containing a ratio of at least 2 grams of oil/fat per 78 grams of unpopped kernels;
      (ii) said oil/fat-containing slurry comprising a fat/oil-component having a solid fat index of at least 20 at 50° F. and comprising a blend of:
         (A) a solid oil component comprising partially hydrogenated soybean oil and having a solid fat index at 50° F. of at least 50 and a melting point of at least 100° F. and no greater than about 110° F.; said slurry comprising at least about 25% and no more than about 32%, by wt., solid, partially hydrogenated, soybean oil; and
         (B) a liquid oil component comprising a modified liquid vegetable oil having an oleic acid content at least 10% higher than when unmodified; said slurry comprising at least 12%, by wt., and no more than about 30%, by wt., liquid vegetable oil;
   said fat/oil-component having a ratio of solid oil component to liquid oil component, by wt., within the range of 2:1 to 0.75:1; and
   wherein said popcorn product, when popped, has a calculated nutritional content of:
      (i) no more than 3 grams of total fat, per 30 gram serving; and
      (ii) less than 0.45 gram of unsaturated fat, per 30 gram serving.

2. A microwave popcorn product according to claim 1 wherein:
   (a) said product includes at least 200 milligrams of salt per 30 gram serving.

3. A microwave popcorn product according to claim 2 wherein:
   (a) said product includes 300–400 milligrams of salt per 30 gram serving.

4. A microwave popcorn product according to claim 2 wherein:
   (a) said salt consists essentially of: powdered salt or fine grind salt or mixtures thereof.

5. A microwave popcorn product according to claim 2 wherein:
   (a) said oil/fat-containing slurry includes an effective amount of butter flavoring.

6. A microwave popcorn product according to claim 5 wherein:
   (a) said butter flavoring comprises an oil carrier containing flavoring present in an amount such that oil in said flavoring comprises up to 20%, by weight, of the total fat/oil content of said oil/fat-containing slurry.

7. A microwave popcorn product according to claim 1 wherein:
   (a) said modified liquid vegetable oil comprises a modified Canola oil.

* * * * *